United States Patent
Solomon et al.

(10) Patent No.: US 10,437,323 B2
(45) Date of Patent: Oct. 8, 2019

(54) CONTROLLING A HEAD MOUNTED DEVICE

(71) Applicant: Fieldbit LTD., Kfar-Saba (IL)

(72) Inventors: Shay Solomon, Kfar-Saba (IL); Evyatar Meiron, Kfar-Saba (IL); Alex Rapoport, Tel-Aviv (IL)

(73) Assignee: FIELDBIT LTD., Kfar-Saba (IL)

( * ) Notice: Subject to any disclaimer, the term of this patent is extended or adjusted under 35 U.S.C. 154(b) by 0 days.

(21) Appl. No.: 14/816,012

(22) Filed: Aug. 2, 2015

(65) Prior Publication Data

US 2016/0349838 A1 Dec. 1, 2016

Related U.S. Application Data

(63) Continuation-in-part of application No. 14/726,542, filed on May 31, 2015.

(51) Int. Cl.
  *G06F 3/01* (2006.01)
  *G02B 27/01* (2006.01)
  *G06F 3/0484* (2013.01)
  *G02B 27/00* (2006.01)

(52) U.S. Cl.
  CPC ......... *G06F 3/012* (2013.01); *G02B 27/0093* (2013.01); *G02B 27/017* (2013.01); *G06F 3/04842* (2013.01); *G02B 2027/0138* (2013.01); *G02B 2027/0141* (2013.01); *G02B 2027/0187* (2013.01)

(58) Field of Classification Search
  CPC .............. G02B 27/017; G02B 27/0172; G02B 27/0176; G02B 2027/0174; G02B 2027/0178; G02B 2027/0187; G06F 3/012; G06F 3/013
  See application file for complete search history.

(56) References Cited

U.S. PATENT DOCUMENTS

| | | | |
|---|---|---|---|
| 6,259,436 B1* | 7/2001 | Moon | G06F 3/0488 345/173 |
| 8,643,951 B1* | 2/2014 | Wheeler | G06F 3/012 359/630 |
| 9,035,878 B1* | 5/2015 | Wheeler | G06F 3/0484 345/156 |
| 9,547,412 B1* | 1/2017 | Dillon | G06F 3/04815 |
| 9,575,563 B1* | 2/2017 | Li | G06F 3/017 |
| 2013/0135353 A1* | 5/2013 | Wheeler | G09G 3/003 345/660 |
| 2013/0139082 A1* | 5/2013 | Wheeler | G06F 3/012 715/765 |
| 2013/0246967 A1* | 9/2013 | Wheeler | G06F 3/012 715/784 |

(Continued)

*Primary Examiner* — Dong Hui Liang
(74) *Attorney, Agent, or Firm* — Reuven K. Mouallem, LL.M.; FlashPoint IP Ltd.

(57) ABSTRACT

A method for controlling a display of a head mounted display (HMD) device, the method may include projecting on a display of the HMD device a given user interface element; sensing, by a sensor, a head movement of a user of the HMD device; unchanging a position of the projection of the given user interface element when a speed of the head movement is below a first speed threshold; and changing the position of the given user interface element when the speed of the head movement exceeds the first speed threshold.

19 Claims, 15 Drawing Sheets

(56) References Cited

U.S. PATENT DOCUMENTS

2014/0225814 A1* 8/2014 English .............. G02B 27/017
345/8
2016/0080732 A1* 3/2016 Pedley .............. H04N 13/0425
345/8

* cited by examiner

CONTROLLING A HEAD MOUNTED DEVICE

RELATED APPLICATIONS

This application is a continuation in part of U.S. patent application Ser. No. 14/726,542 filing date May 31, 2015, which is incorporated herein by reference.

BACKGROUND

GOOGLE GLASS™ is one of the known head mounted display devices. It displays to a user augmented reality and can be controlled by a touchpad that is located on the side of GOOGLE GLASS™, allowing users to control the device by swiping through a timeline-like interface displayed on the screen. Sliding backward shows current events, such as weather, and sliding forward shows past events, such as phone calls, photos, circle updates, etc.

Using a touchpad is awkward and may be improper in scenarios that require a hand free control of a head mounted display (HMD) device.

There is a growing need to provide an efficient hand free control of a HMD device.

SUMMARY

There are provided systems, methods and non-transitory computer readable media, as illustrated in the claims.

According to an embodiment of the invention there may be provided a method for controlling a display of a head mounted display (HMD) device, the method may include projecting on a display of the HMD device a given user interface element and a selectable user interface element; sensing, by a sensor, a head movement of a user of the HMD device; unchanging a position of the projection of the selectable user interface element when a speed of the head movement is below a first speed threshold; and changing the position of the projection of the selectable user interface element when the speed of the head movement exceeds the first speed threshold.

The changing of the position of the selectable user interface element may include tracking the head movement.

The method may include projecting the given user interface element on a fixed location of the display of the HMD device; and determining that the user selected the selectable user interface element when the given user interface element and the selectable user interface element overlap for a predefined overlap period.

The method may include determining that the user selected the selectable user interface element when during the predefined overlap period the head of the user maintained still.

The predefined overlap period exceeds one second.

The method may include associating multiple frames of user selectable interface elements with multiple segments of a three dimensional space having an axes system; unchanging a position of the axes system when the speed of the head movement is below the first speed threshold; and changing the position of the axes system when the speed of the head movement exceeds the first speed threshold; and displaying to the user at least one of the multiple frames based upon a relationship between a field of view of the user and the axes system.

The given user interface element is projected on a center of the display of the HMD device.

The method may include associating a first frame of user interface elements with an area of the display of the HMD device; and unchanging a position of the projection of the first frame of the user interface elements when the speed of the head movement is below the first speed threshold; wherein the first frame of user interface elements may include the given user interface element.

The HMD device may be a see-through binocular head mounted display (STBHMD) device and the method may include performing a calibration process based upon (i) at least a first image of an object and (ii) feedback from the user of the STBHMD device; receiving an input augmented image of the object; wherein the input augmented image of the object may include a certain image of the object and input digital content that refers to a certain element of the object; calculating, in response to an outcome of the calibration process, output digital content that refers to a visual representation of the certain element of the object in second images of the object; and displaying the output digital content on the display of the STBHMD thereby forming output augmented images of the object.

According to an embodiment of the invention there may be provided a non-transitory computer readable medium that stores instructions that once executed by a head mounted display (HMD) device cause the HMD device to execute the steps of projecting on a display of the HMD device a given user interface element; sensing, by a sensor, a head movement of a user of the HMD device; unchanging a position of the projection of the given user interface element when a speed of the head movement is below a first speed threshold; and changing the position of the given user interface element when the speed of the head movement exceeds the first speed threshold.

According to an embodiment of the invention there may be provided a head mounted display (HMD) device that may include a camera, a display, a projector, a processor and a sensor; wherein the projector may be configured to project on a display of the HMD device a given user interface element; wherein the sensor may be configured to sense a head movement of a user of the HMD device; wherein the processor may be configured to unchange a position of the projection of the given user interface element when a speed of the head movement is below a first speed threshold; and wherein the processor may be configured to change the position of the given user interface element when the speed of the head movement exceeds the first speed threshold. The processor controls the content that is projected by the projector. Thus—the controller may determine to change or not to changes an aspects of the displayed content and the projector fulfills this determination.

The changing of the position of the selectable user interface element may include tracking the head movement.

The projector may be configured to project the given user interface element on a fixed location of the display of the HMD device; and wherein the processor may be configured to determine that the user selected the selectable user interface element when the given user interface element and the selectable user interface element overlap for a predefined overlap period.

The processor may be configured to determine that the user selected the selectable user interface element when during the predefined overlap period the head of the user maintained still.

The predefined overlap period exceeds one second.

The processor may be configured to associate multiple frames of user selectable interface elements with multiple segments of a three dimensional space having an axes system; unchange a position of the axes system when the speed of the head movement is below the first speed threshold; change the position of the axes system when the speed of the head movement exceeds the first speed threshold; and wherein the projector may be configured to display to the user at least one of the multiple frames based upon a relationship between a field of view of the user and the axes system.

The given user interface element may be projected on a center of the display of the HMD device.

The processor may be configured to associate a first frame of user interface elements with an area of the display of the HMD device; and wherein the processor may be configured to unchange a position of the projection of the first frame of the user interface elements when the speed of the head movement is below the first speed threshold; wherein the first frame of user interface elements may include the given user interface element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
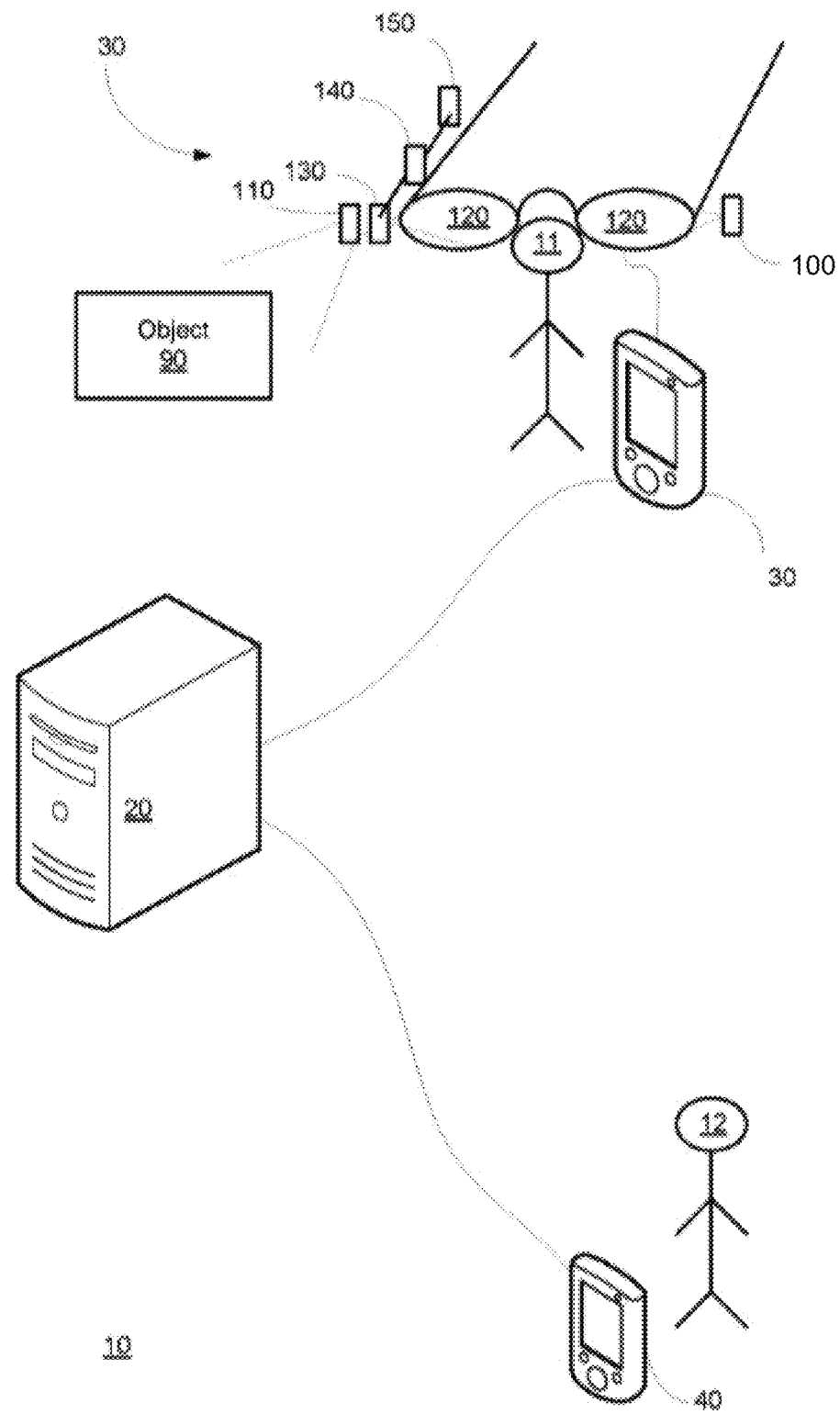
FIG. 1 illustrates a system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

FIG. 1 illustrates a system 10 according to an embodiment of the invention.

System 10 includes first device 30 of a first person 11, second device 40 of a second person 12, a see-through binocular head mounted display (STBHMD) device 100 worn by the first person, and a remote computer such as a cloud server 20. FIG. 1 is out of scale.

STBHMD device 100 may be shaped as a wearable glass.

Cloud server 20, first device 30, second device 40 and STBHMD device 100 may be coupled to each other over one or more networks.

Cloud server 20 can store at least part of the traffic exchanged between the first and second devices, relay the traffic between the first and second devices, and the like.

First device 30 and second device 40 may be mobile phones, personal data assistants, tablets or any other computerized system.

The first person may be a remote technician. The first person may request to receive guidance from the second person relating to a maintenance operation related to an object or any other operation related to the object.

The first device 30 may send, to the second device 40, a first image of the object. The first image may be acquired by STBHMD device 100 or by first device 30.

The second person may create digital content (referred to as input digital content) that may refer to a certain element of the object. The digital content may be fed to the second device 40 using any known method.

The input digital content may be one or more symbols, text and the like. For example—the input digital content may include a circle that surround the certain element of the object, an arrow pointing to the certain element of the object, and the like.

Second device 40 may overlay the input digital content onto an image of the object to provide an input augmented image of the object.

STBHMD device 100 may perform, with an assistance of the first person, a calibration process in order to determine the spatial relationship between STBHMD device 100 at a certain moment. The calibration process is significant because the optical axis of a camera of STBHMD device 100 is not aligned with the line of sight of the first person. It is noted that the calibration process may be skipped under certain circumstances. For example—when the dimensions of the object and/or one or more object elements are known and can be used for determining the spatial relationship to STBHMD system 100.

STBHMD device 100 may use the outcome of the calibration process in order to generate an output augmented image of the object in which an output digital content is properly overlaid on the certain element of the object—as viewed by the first person.

The calibration process may include multiple calibration iterations.

Figure 2:
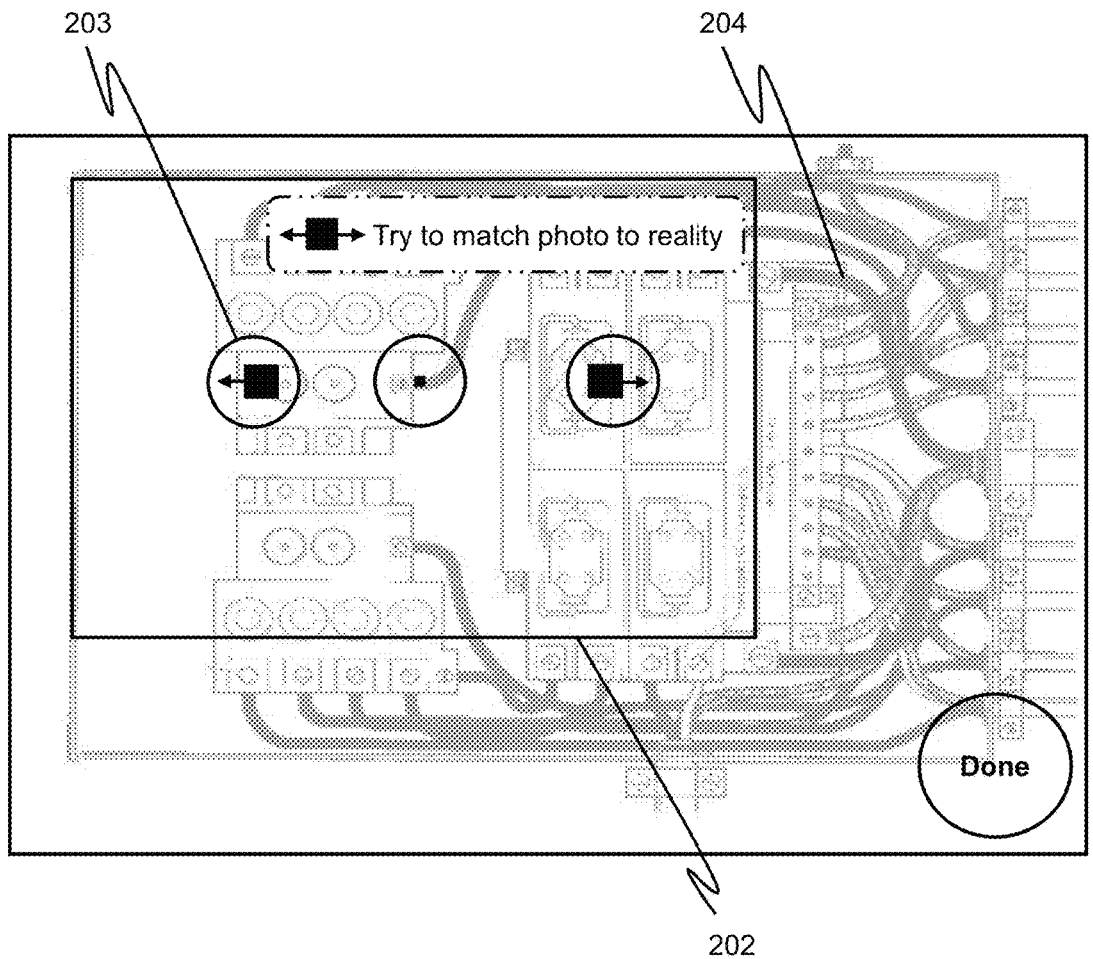
FIG. 2 an partially transparent representation of an image of an object that is overlaid over an image of the object as seen through a display of a see-through binocular head mounted display (STBHMD) device according to an embodiment of the invention.

During each calibration iteration STBHMD device 100 displays a partially transparent representation of a first image of the object (hereinafter "partially transparent representation") so that the first person sees the object itself and the partially transparent representation of the first image of the object—see for example FIG. 2 that illustrates a partially transparent representation 202 overlaid over object 204 as seen by the first person.

STBHMD device 100 then receives feedback from the first person relating to the alignment or misalignment between the object itself and the partially transparent representation.

STBHMD device 100 may, for example, display one or more control symbols (for example—a move right symbol, a move left symbol, a move up symbol, a move down symbol, an increase scale symbol, a decrease scale symbol, a calibration completion symbol, or any other control symbols) and allow the first person to elect one of these symbols by performing one or more head movements and/or one or more gestures for selecting one of the symbols. FIG. 2 illustrates an example of control symbol 203.

A symbol may be selected, for example by looking (by the first person) at the same direction for over a predefined period (for example—more than one second).

STBHMD device 100 may then determine whether the calibration process succeeded or whether to perform another calibration iteration. When determining to perform another calibration iteration then STBHMD device 100 changes at least one parameter of the partially transparent representation of the first image to provide a next partially transparent representation of the first image to be used during the next calibration iteration.

The feedback can include at least one out of a vocal instruction, a head movement, any movement within the field of view of STBHMD device 100, a contact between the first person and STBHMD device 100 (pressing a control button), and the like.

Once the calibration process ends, STBHMD device 100 may determine the spatial relationship between STBHMD device 100 and the object.

The spatial relationship may be fed to a tracking module of STBHMD device 100 that tracks the movements of STBHMD device 100 in order to properly overlay the output digital content on any image of the object.

FIG. 1 illustrates STBHMD device 100 as including camera 110, display 120, projector 130, processor 140 and a sensor 150.

Camera 110 may acquire images. Display 120 is a see-through display. Projector 130 may project digital content onto display 120. Processor 140 may determine the manner in which the digital content is projected on display 120. Processor 140 may perform motion tracking.

Sensor 150 may be an accelerometer, a gyroscope or any other sensor that may sense movements of the head of the first person. Sensor 150 may be a voice sensor capable of detecting (with or without the help of processor 140) voice commands. Alternatively, sensor 150 may be the camera 110 wherein processor 140 may detect head movements and/or gestures made within the field of view of camera 110.

Figure 3:
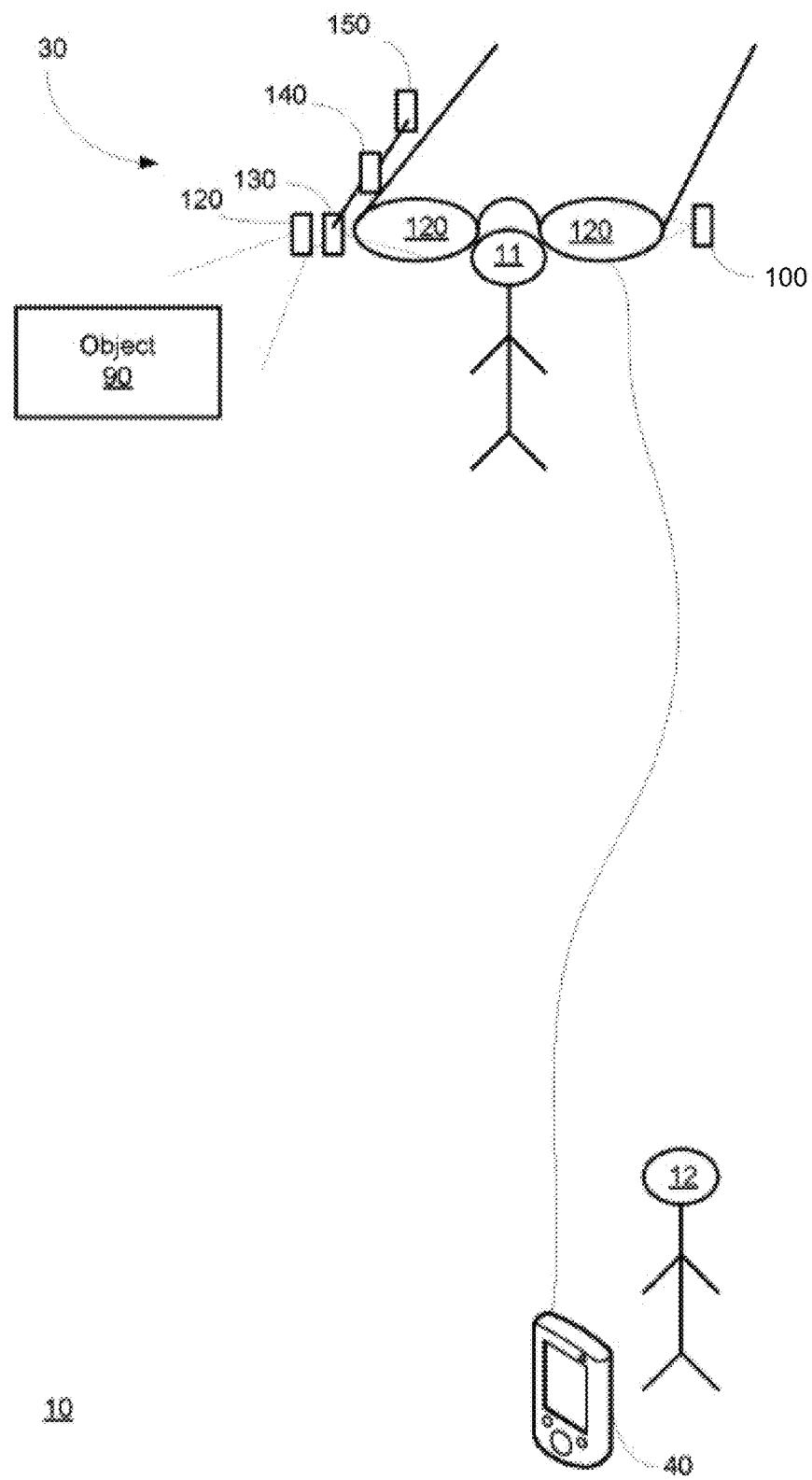
FIG. 3 illustrates a system according to an embodiment of the invention.

FIG. 3 illustrates a system 10 according to an embodiment of the invention.

System 10 includes second device 40, STBHMD device 100 and one or more networks (not shown).

In system 10 of FIG. 3 STBHMD device 100 communicates with second device 40 without the assistance of a cloud server.

Figure 4:
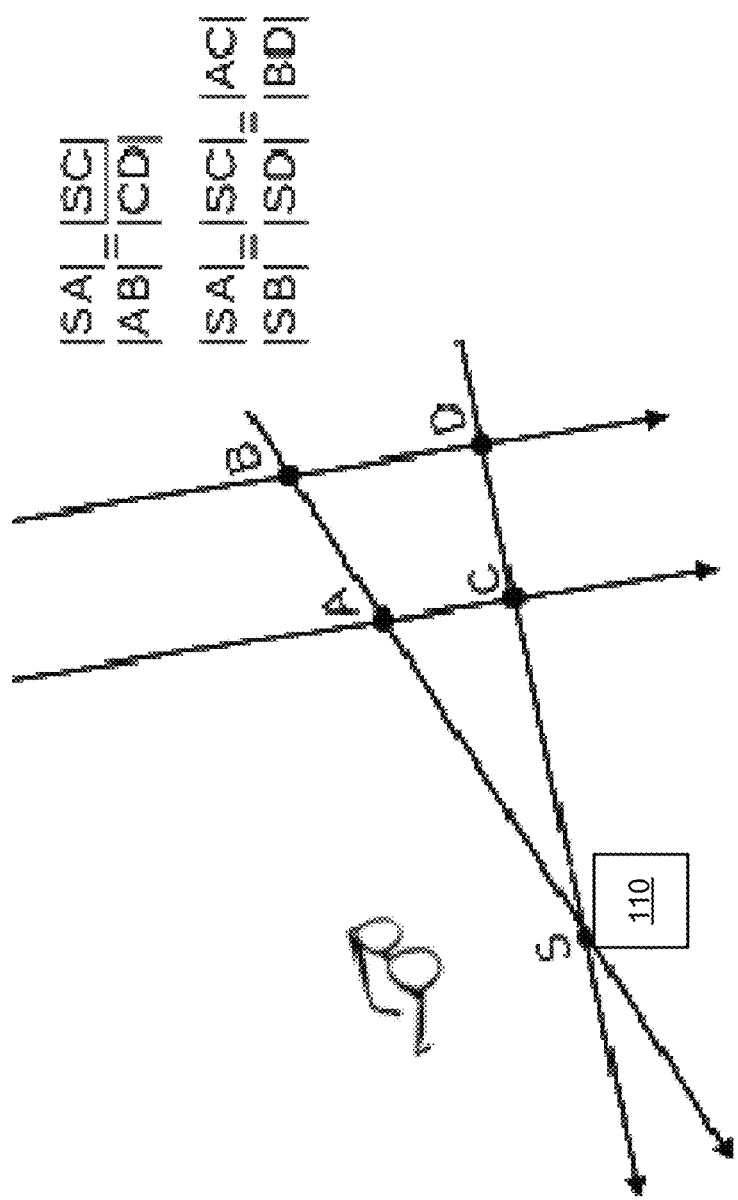
FIG. 4 illustrates various aspects of a calibration process.

FIG. 4 illustrates various aspects of a calibration process.

The calibration process assists in achieving spatial relationship information that may allow accurate augmentation of digital information over an image located at unknown distance or having unknown dimensions.

The calibration process may be based upon the intercept theory. in elementary geometry about the ratios of various line segments that are created if two intersecting lines are intercepted by a pair of parallels, as can be seen in the FIG. 3.

FIG. 4 illustrates a location (represented by point S) of STBHMD device 100, a location of an object (represented by points S and D) and an initial estimated location of the object (represented by points A and C).

According to the theorem, there is a fixed ratio between the distance from STBHMD device 100 (SC or SD) to the target width (AC or BD).

When the first person looks at the object, and the object is identified by STBHMD device 100, an partially transparent representation of a first image of the object is displayed to the user so the user can see both the real object and the partially transparent representation.

Because the initial estimated location of the object is erroneous the partially transparent representation and the object (as seen by the first person) are misaligned.

STBHMD device 100 performs, using feedback from the first person, a calibration process and once the user approves that an alignment is obtained—STBHMD device 100 may assume that the distance between STBHMD device 100 and the object is known. The distance may be a length of an imaginary normal from point S to section DB.

According to an embodiment of the invention the calibration process may include setting the partially transparent representation to be of a predefined size (scale) and the user may change the size (scale). The scale may be changes by a scaling factor.

For example, STBHMD device 100 may scale the partially transparent representation of the first image to a fixed size (keep ratio), e.g. 640*480 pixels, assuming that each pixel represents a 1 mm square area. It is noted that the number of pixels may differ from 640*480 pixels.

STBHMD device 100 uses a metric of 1 px in the image is equal to 1 mm in reality. It is noted that the metric may differ from one pixel per millimeter.

STBHMD device 100 may start the calibration process using a predefined scale factor FACTOR (which sets the sensitivity/accuracy level of the alignment).

STBHMD device 100 then starts the multiple calibration iterations during which the feedback from the first person may require the partial transparent representation to move and/or to change its scale (thereby increasing or decreasing its size).

There is provides an example of a pseudo-code:

```
WIDTH_MM = 640
HEIGHT_MM = 480
FACTOR = 0.1
MAX = 10 #6.4 Meter
MIN = 0.1 #6.4 cm
K = 1
Annotation_init(IMAGE,K)
Start_track(IMAGE, WIDTH_MM, HEIGHT_MM)
while (TRUE)
    if (scaling_input_arrived)
        if (scale_up and K < MAX) // received from user head movement
            K = K + FACTOR
        else if (scale_down and K > MIN) //scale_down
            K = K - FACTOR
        restart_tracking(IMAGE, WIDTH_MM*K, HEIGHT_MM*K)
        Annotation_Rescale(K)
```

Figure 5:
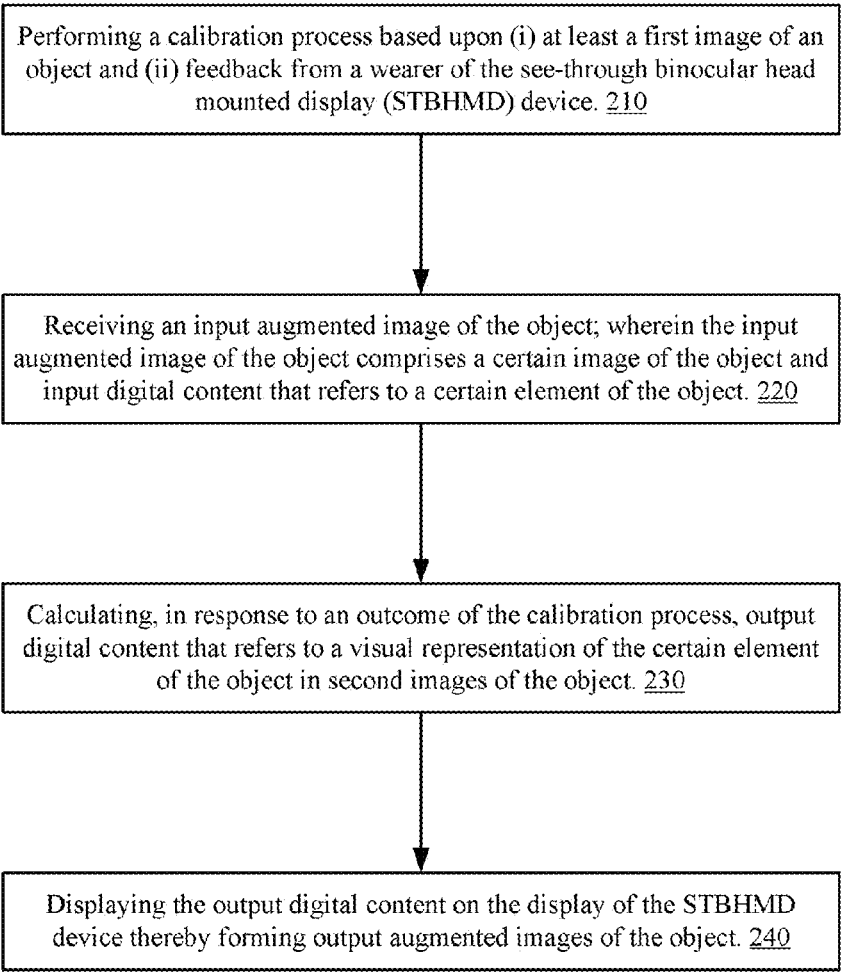
FIG. 5 illustrates a method according to an embodiment of the invention.

FIG. 5 illustrates method 200 for providing augmented reality, according to an embodiment of the invention.

Method 200 may start by stage 210 of performing a calibration process based upon (i) at least a first image of an object and (ii) feedback from a wearer of the see-through binocular head mounted display (STBHMD) device.

The first image of the object may be acquired by the STBHMD device or by another device—such as first device 30 of FIG. 1.

Stage 210 may include performing multiple calibration iterations.

Each calibration iteration may include (i) displaying, on a display of the STBHMD device, and at different point in time of the calibration process, partially transparent representations of the first image of the object, (ii) receiving the feedback from the wearer of the STBHMD device; (iii) changing, in response to the feedback from the wearer of the STBHMD device, at least one parameter of a current partially transparent representation of the first image of the object to provide a next partially transparent representation of the first image.

The at least one parameter may be a scale of the partially transparent representation of the first image. Method 200 may include changing the resolution of the scale.

Figure 6:
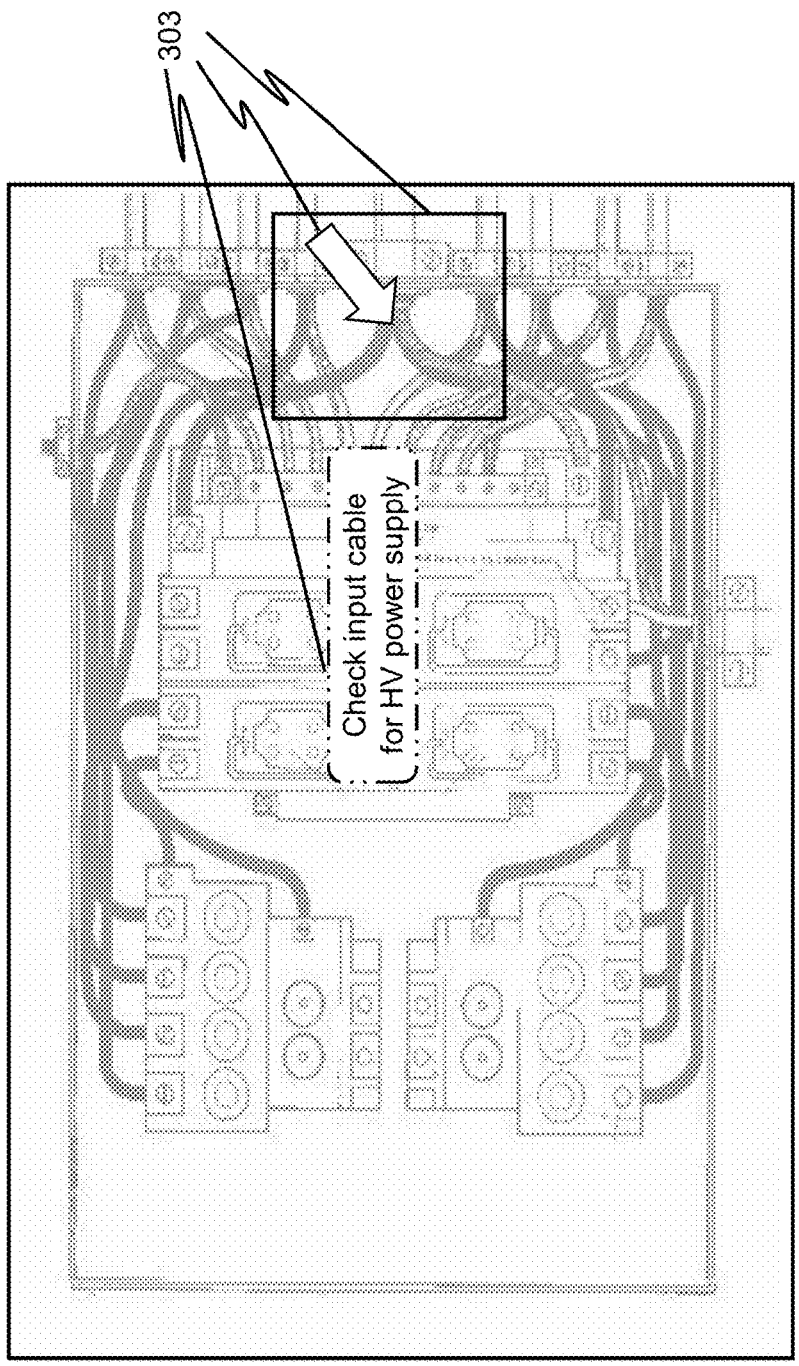
FIG. 6 illustrates an input augmented image according to an embodiment of the invention.

Stage 210 may be followed by stage 220 of receiving an input augmented image of the object; wherein the input augmented image of the object comprises a certain image of the object and input digital content that refers to a certain element of the object. FIG. 6 illustrates an example of an input augmented image 301 that includes input digital content 303.

The certain image of the object may be acquired by the STBHMD device or by another device—such as first device 30 of FIG. 1. The certain image of the object may be acquired during the calibration process or outside the calibration process.

Stage 220 may be followed by stage 230 of calculating, in response to an outcome of the calibration process, output digital content that refers to a visual representation of the certain element of the object in second images of the object.

Figure 7:
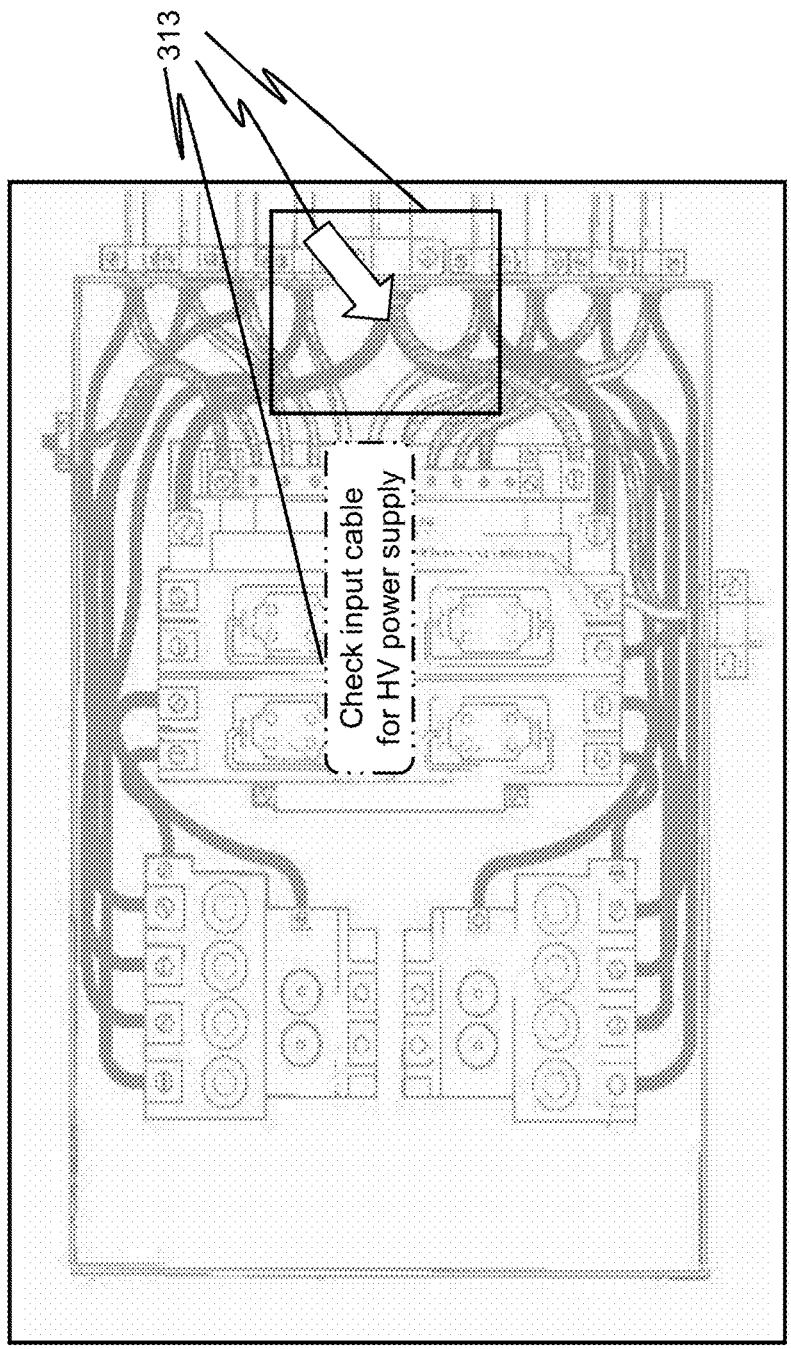
FIG. 7 illustrates an output augmented image according to an embodiment of the invention.

Stage 230 may be followed by stage 240 of displaying the output digital content on the display of the STBHMD device thereby forming output augmented images of the object. FIG. 7 illustrates an example of an output augmented image 311 that includes output digital content 313.

Stage 230 may be responsive to a relationship between the certain image of the object and the second images of the object. For example—a tracking unit may determine changes in the distance between the STBHMD device and the object and/or changes in a direction of image acquisition associated with the certain image of the object and the second images.

According to an embodiment of the invention there is provided a hand-free scheme for controlling a HMD device. The HMD device may be a binocular or monocular see-through binocular HMD device or any other type of HMD.

The HMD device displays to the user a frame of user interface elements. User interface elements may be icons or any other symbol, text, image and the like that can assist the user to control the HMD device.

A user may control the HMD device by selecting a selectable user interface element. A selectable user interface element can be selected by the user by performing a head movement that causes the given user interface element to overlap with the selectable user interface element.

The user can be provided with a large amount of selectable user interface elements that may belong to multiple frames.

The HMD device may display to the user one (or more) frame at a time and the selection between the frames can be responsive to the orientation of the head of the user and to the location of the given user interface element.

The user can orient his head within a three dimensional space.

According to an embodiment of the invention, as long as the user moves his head as an adequate speed (above a first speed threshold and maybe below a second speed threshold) the HMD device may display to the user the frames that are associated with the different orientations of the head.

According to an embodiment of the invention, as long as the user moves his head as an inadequate speed (below the first speed threshold and maybe above the second speed threshold) the HMD device may display to the user the same frame and the entire axes system of the multiple frame tracks the movement of the head.

The overall number of selectable user interface elements and/or the number of selectable user interface elements per frame may be predetermined, set by the user, updated by the user or updated by another entity, and the like.

There is provided a hand free control scheme that is not sound based and thus is immune to ambient sounds and is more robust the sound based control scheme.

FIGS. 9-15 illustrates an example of the execution of method 800 according to an embodiment of the invention.

Figure 9:
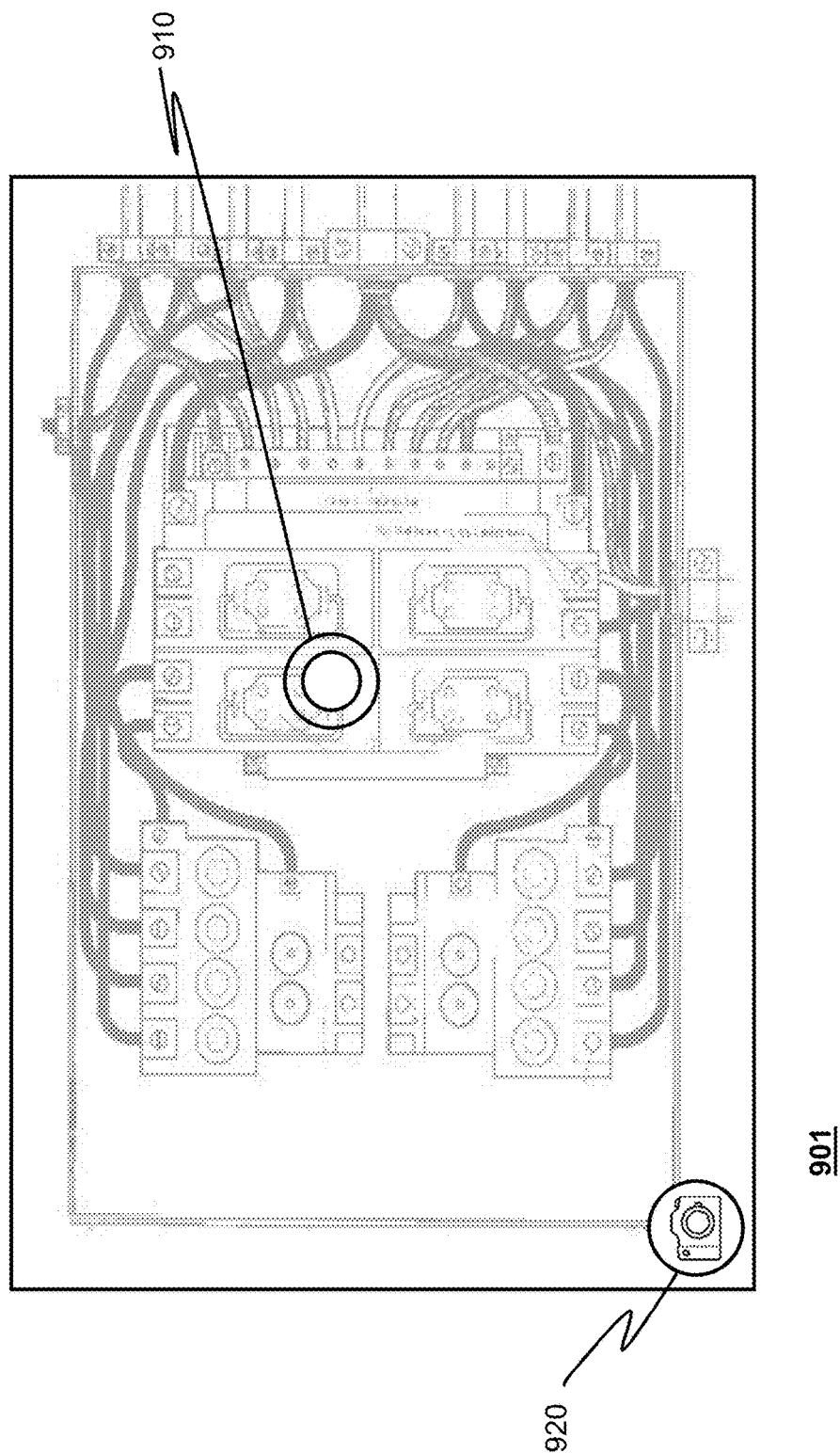
FIGS. 9-12 illustrate screen shots of the display of a STBHMD device according to an embodiment of the invention.
Figure 10:
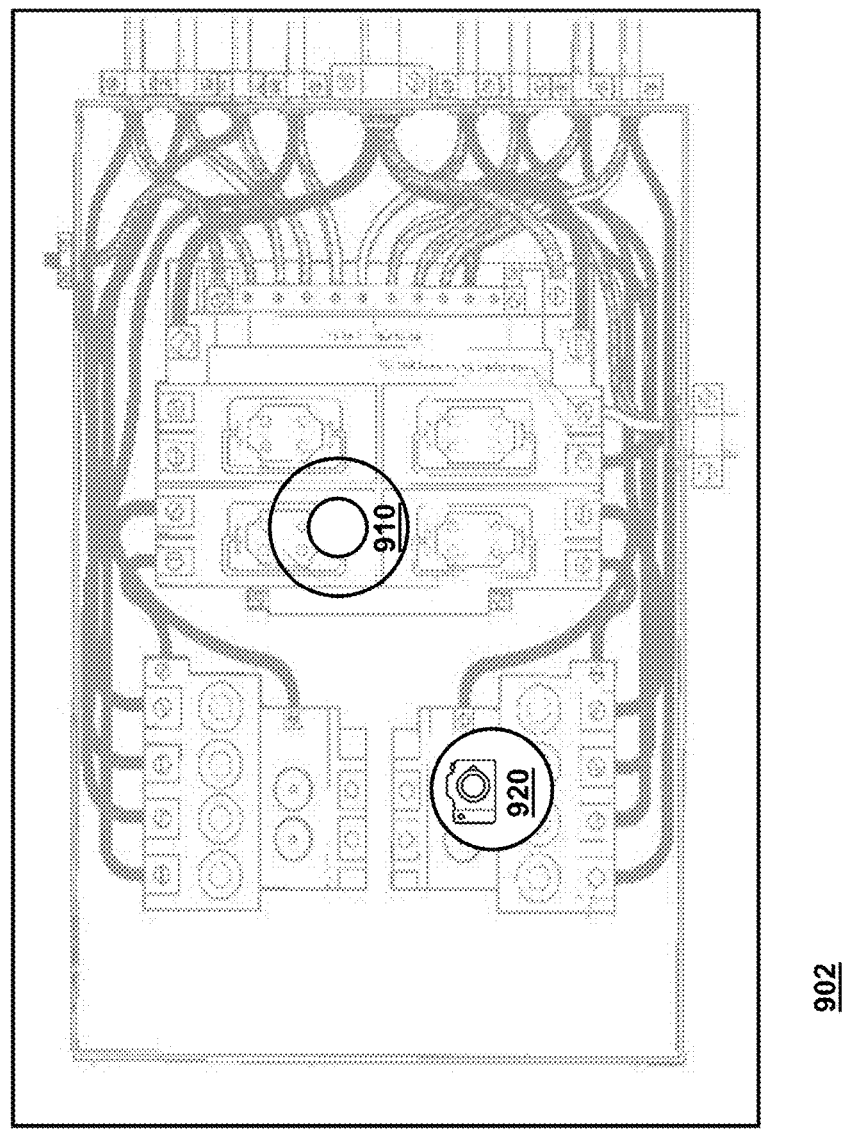
Figure 11:
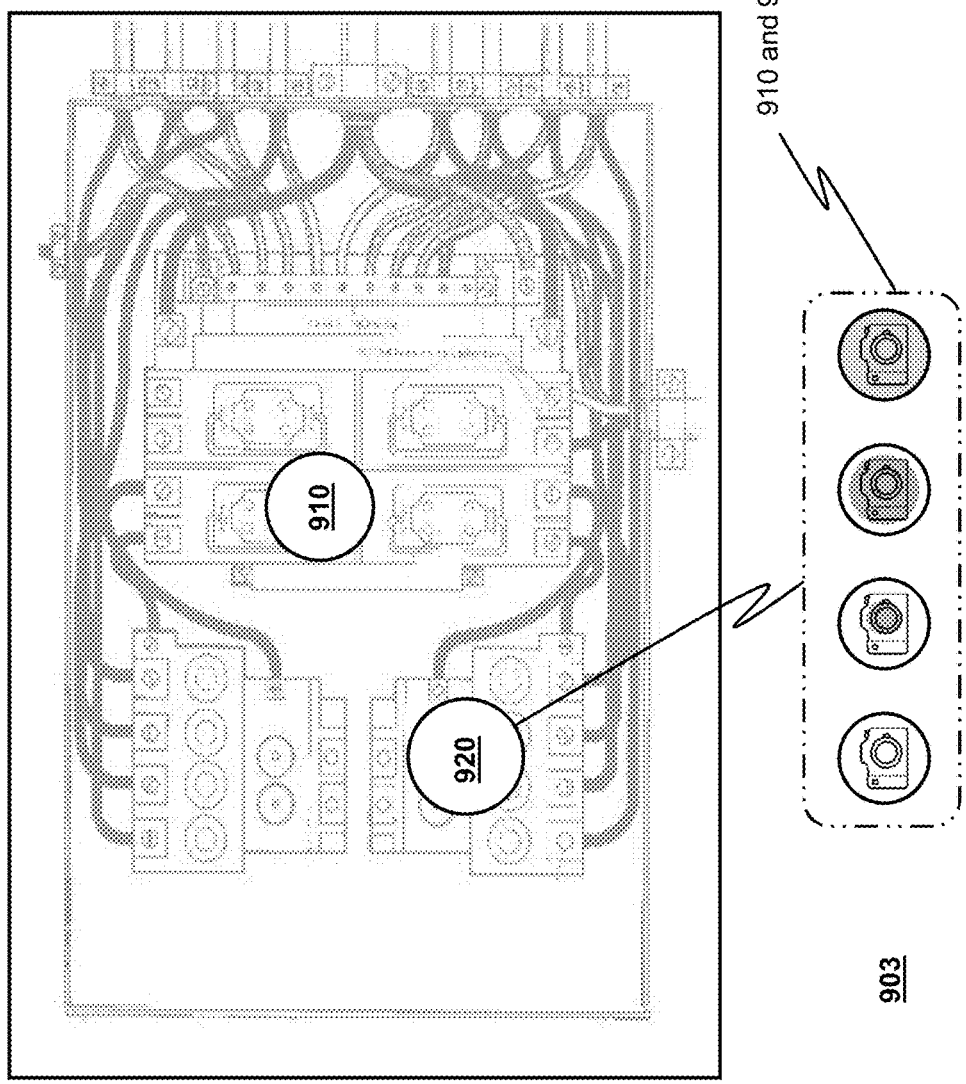
Figure 12:
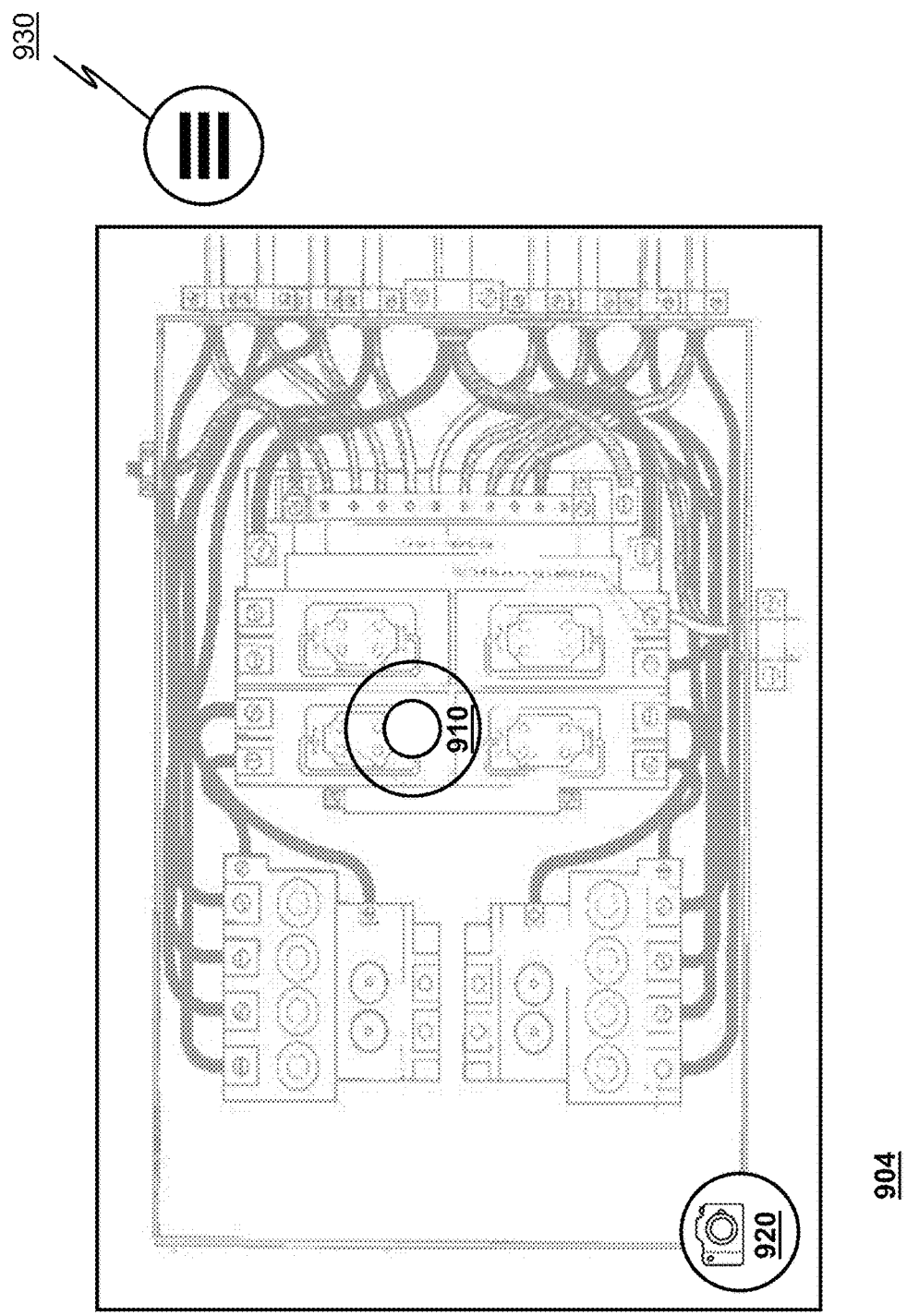

FIGS. 9-11 illustrate screen shots 901, 902 and 903 of the display of a HMD device according to an embodiment of the invention.

The screen shot 901 illustrates a part of a system that may be maintained by the user and a frame of user interface elements that include a given user interface element 910 that is located at the center of the screen and a selectable user interface element 920 that once selected causes the camera of the HMD device to take a picture.

The given user interface element 910 can be maintained at the center of the display (or in any predefined location) regardless of the head movement of the user.

The selectable user interface element 920 can move towards the given user interface element 910 when the user moves his head at a speed that exceeds a first speed threshold. This is shown in screen shots 901, 902 and 903 in which the given user interface element 910 and the selectable user interface element 920 get closer to each other due to the movement of the head of the user (at an adequate speed) towards the selectable user interface element 920.

According to an embodiment of the invention the adequate speed may be delimited by a first speed threshold. The first speed threshold may be, for example, 2.5 degrees per second.

FIG. 11 shows various overlaps between the selectable user interface element 920 and the given user interface element 910.

When the head movement is too slow the HMD device may ignore the movement in the sense that the same user interface elements are shown at the same location on the display of the HMD device.

Accordingly, when the head movement is too slow the entire digital content that is overlaid over the "reality" (the image acquired by the camera of the HMD device or merely through the display itself) may freeze and not more in relation to the field of view of the user.

Since the user moves his head in some direction, he will obviously see something else from the reality, assuming the camera is working or he is in an optical see-through mode.

However, if the current display blocks reality (e.g. full screen image with no transparent parts), he will not see any difference at all.

If the head movement faster than 2.5 degrees per seconds the selectable elements are still static in the view, however the given user interface element 910 will track the head movements, allowing the given user interface element 910 to get closer to the selectable user interface element 920, as illustrated in FIGS. 9-11. according to the movement. See, for example, FIG. 10.

If the given user interface element 910 overlaps with multiple selectable user interface elements then the selectable user interface element 920 with the bigger overlap area is selected.

The selection is not an immediate action. Once there is an interaction, the user needs to keep his head on the target for a predefined overlap period (for example—a second) until the selectable user interface element 920 is really selected.

Since the head is moving all the time, especially when working on some equipment, false alarms (accidentally selecting an item) are very likely, hence this method is mandatory. See, for example, FIG. 11.

According to an embodiment of the invention if the head movement is paused (the user holds still) for predefined reset period (for example 1.2 seconds), the given user interface element and all selectable user interface elements are returned to the original location, as defined by the application, where the given user interface element may be positioned in the center of view. (For instance. The user moved his head as seen in FIG. 10 and then kept his head steady for 1.2 seconds. The application updated the display back the original location as seen in to FIG. 9).

Since the user has freedom to move his head in all direction, the display is not limited to the current view. The display, including all UI elements, can be located anywhere in the space.

In these cases the user needs to move his head in the direction of the hidden UI element, until the element is seen. See, for example, FIG. 12.

Figure 13:
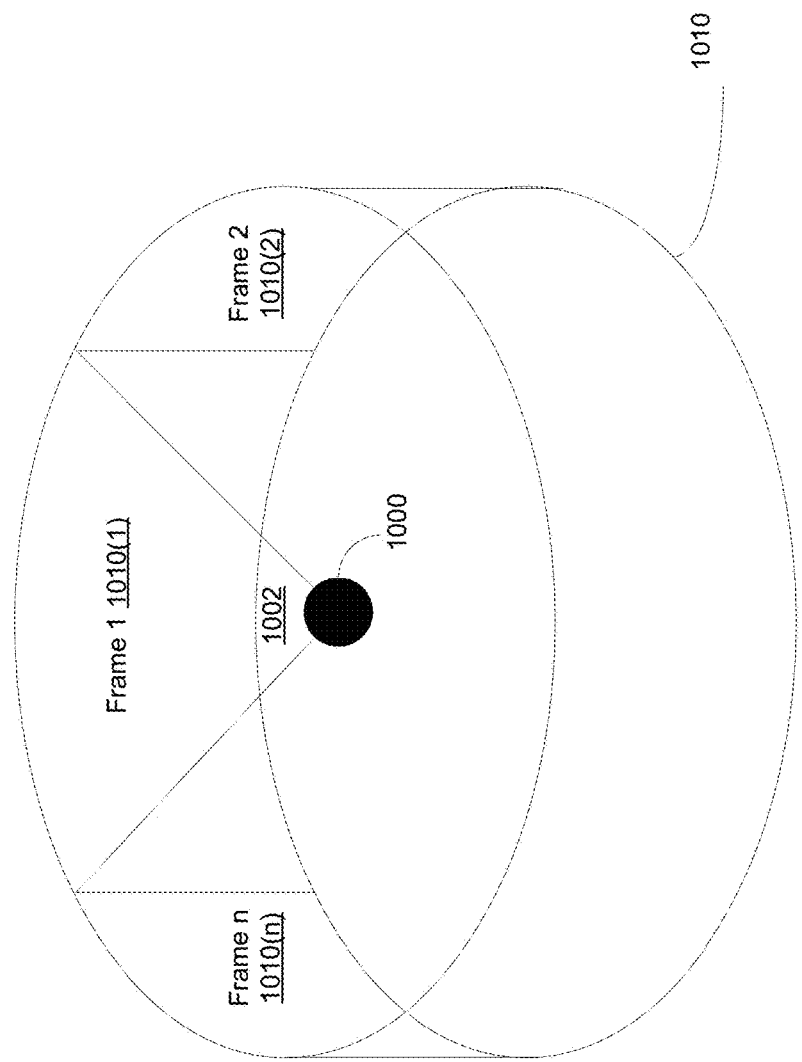
FIGS. 13-15 illustrate a user, a user field of view and a frame of user interface elements displayed to the user according to various embodiments of the invention.
Figure 14:
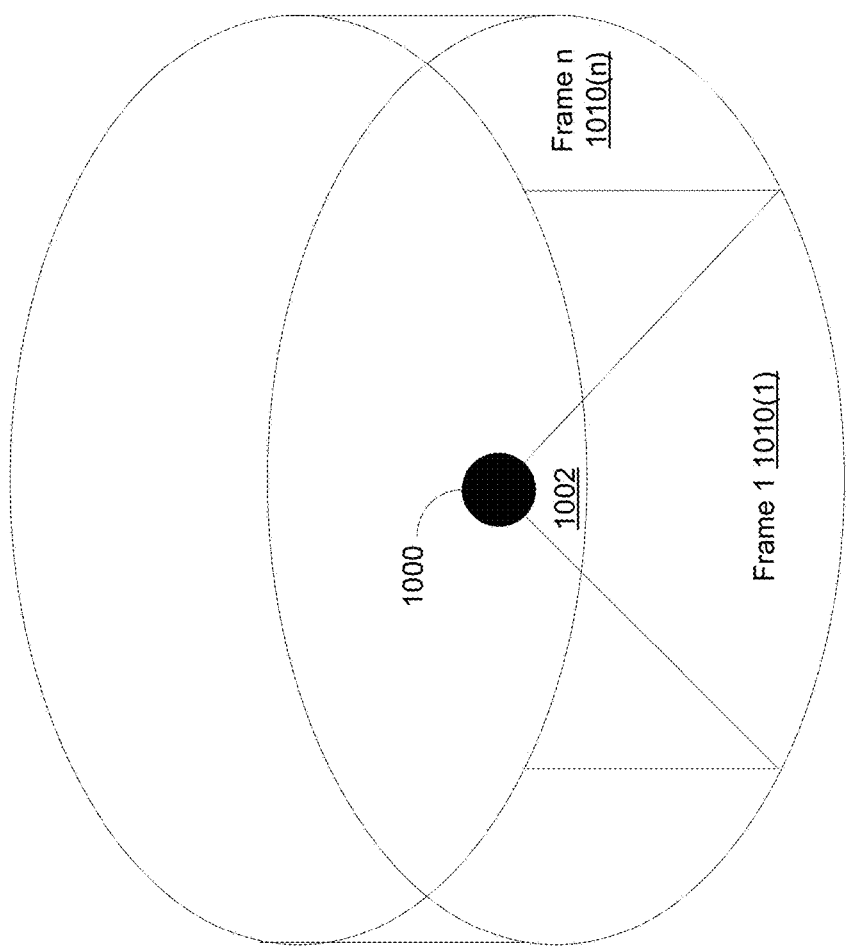
Figure 15:
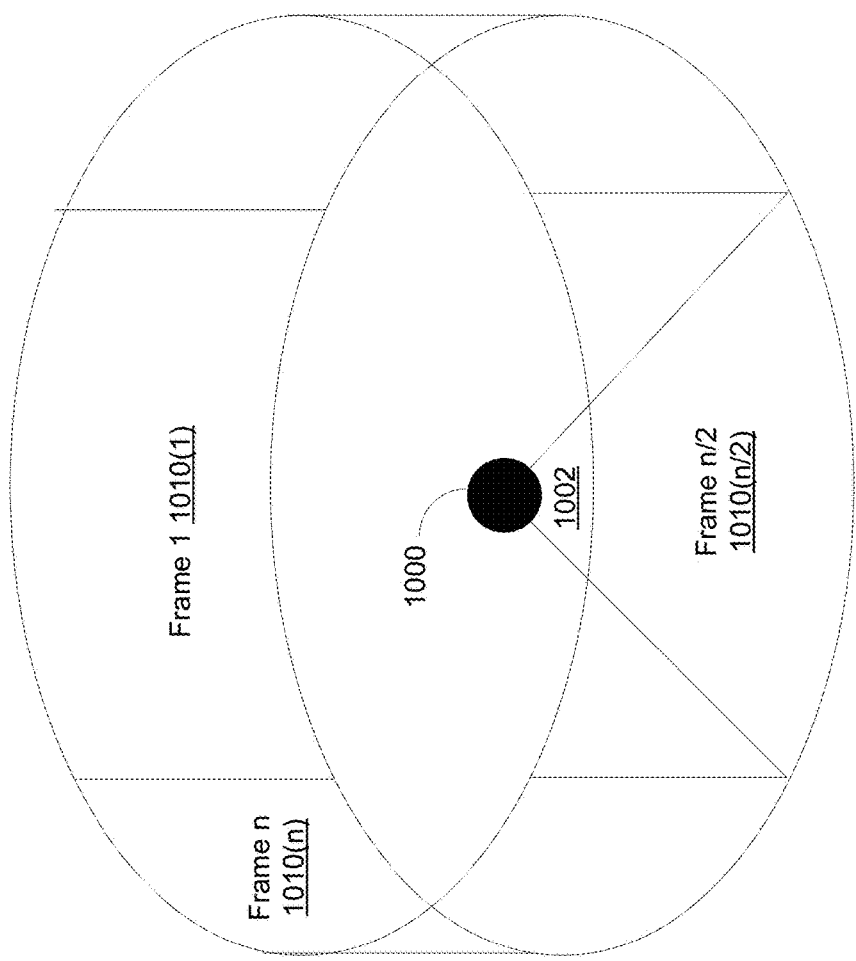

FIGS. 13-15 illustrate a user 1000, a user field of view 1002, and a frame of user interface elements displayed to the user according to various embodiments of the invention.

FIG. 13 illustrates an initial phase in which a user 1000 looks to the north and the HMD device displays to the user a first frame 1010(1), while a second till n'th frame (1010(n)) are outside the field of view 1002 of user 1000.

FIG. 13 illustrates a ring shaped three dimensional space that is segmented to n segments—each segment associated with a different frame of frames 1010(1)-1010(n).

FIG. 14 illustrates a second phase in which user 1000 looks to the south. The user rotated from the initial position by 180 degrees but the head movement was too slow (below the first speed threshold) so that the HMD device continues to display to the user the first frame 1010(1). Thus—the axis system of the three dimensional space had to be rotated by 180 degrees—so that the user will see the same frame (1010(1)) throughout the movement.

FIG. 15 illustrates a second phase in which user 1000 looks to the south. The user rotated from the initial position by 180 degrees but the head movement was fast enough (above the first speed threshold) so that the HMD device display to the (n/2)'th frame 1010(n/2).

Because the head movement was fast enough the axis system of the three dimensional space maintained unchanged and the user was able to scan the first till (n/2)'th frame (assuming a clockwise rotation).

Figure 8:
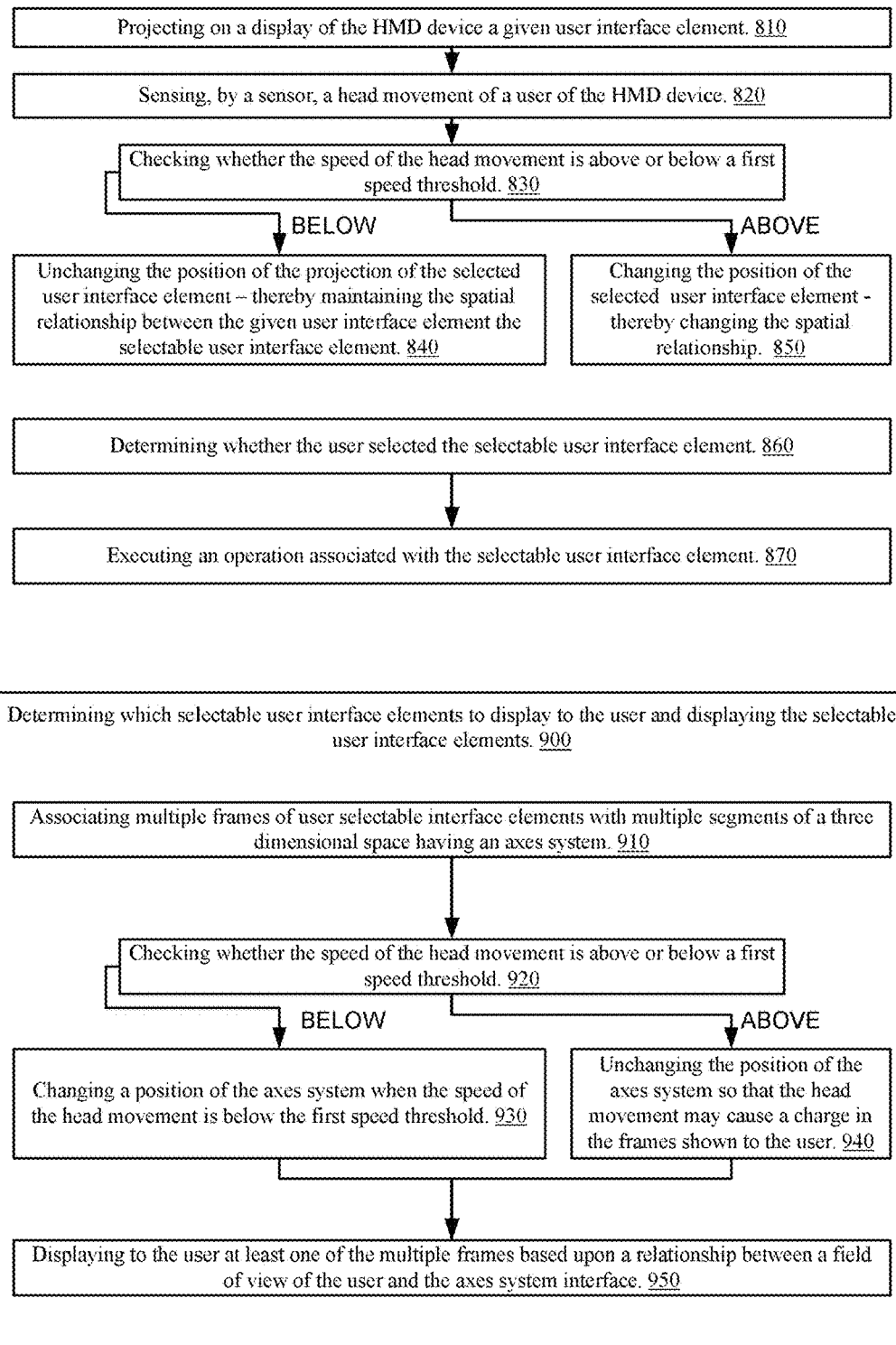
FIG. 8 illustrates a method according to an embodiment of the invention.

FIG. 8 illustrates a method 800 according to an embodiment of the invention.

Method 800 starts by step 810 of projecting on a display of the HMD device a given user interface element.

Step 810 may be followed by step 820 of sensing, by a sensor, a head movement of a user of the HMD device.

Step 820 may be followed by step 830 of checking whether the speed of the head movement is above or below a first speed threshold.

The first speed threshold may be fixed, may change over time, may be set regardless of the user, may be set and/or adapted based upon the user identity, history of user head movements, can be set by the user or another entity, and the like.

If the speed of the head movement is below the first speed threshold then step 830 may be followed by step 840 of unchanging the position of the projection of the selected user interface element—thereby maintaining the spatial relationship between the given user interface element the selectable user interface element.

It is noted that the given user interface element may be long to a frame of user interface elements that are displayed on the display. The position of member of the frame of user interface elements may remain unchanged when the head movement is below the first speed threshold.

When the HMD device also shows the user its environment then the environment may change even when the speed of the head movement is below the first speed threshold.

If the speed of the head movement is above the first speed threshold then step 820 may be followed by step 850 of changing the position of the selected user interface element—thereby changing the spatial relationship between the given user interface element the selectable user interface element.

Step 850 may include tracking the head movement.

According to an embodiment of the invention method 800 may also include step 860. These steps may be executed in parallel to steps 810, 820, 830, 840 and 850.

Step 860 may include determining whether the user selected the selectable user interface element.

Step 860 may include determining that the user selected the selectable user interface element when the given user interface element and the selectable user interface element overlap for a predefined overlap period. The overlap may be a 100% overlap or at least an overlap of the majority (or any threshold) of overlap.

The required overlap and the duration of the predefined overlap period may provide a tradeoff between false selections and the duration of the selection process. Longer predefined overlap period may reduce false selections but may make the selection process awkward.

When determining that the user selected the selectable user interface element then step 860 may be followed by step 870 of executing an operation associated with the selectable user interface element.

Method 800 may also include step 880 of detecting that the head of the user remains still for a predefined reset period (during which there is no overlap between the given user interface element and any selectable user interface element) and resetting the display—configuring the display according to a reset configuration. The reset configuration may be set in advance. The reset configuration may be an initial configuration determined by the application that is being executed by the HMD device.

Method 800 may also include step 900 of determining which selectable user interface elements to display to the user and displaying the selectable user interface elements.

According to an embodiment of the invention the determination may be responsive to the head movement of the user. Non-limiting examples of such determination were shown in FIGS. 13-15.

According to an embodiment of the invention step 900 may include steps 910, 920, 930 and 940.

Step 910 includes associating multiple frames of user selectable interface elements with multiple segments of a three dimensional space having an axes system.

Step 910 may be followed by step 920 of checking whether the speed of the head movement (tracked during step 820) is above or below a first speed threshold.

If the speed of the head movement is below the first speed threshold then step 920 may be followed by step 930 of changing a position of the axes system when the speed of the head movement is below the first speed threshold. In this case the user may see the same frame regardless of his head movement. The axes system may follow the head movement.

If the speed of the head movement is above the first speed threshold then step 920 may be followed by step 940 of unchanging the position of the axes system so that the head movement may cause a change in the frames shown to the user.

Steps 930 and 940 may be followed by step 950 of displaying to the user at least one of the multiple frames based upon a relationship between a field of view of the user and the axes system interface.

It is noted that the user interface element may be displayed by the HMD device over an augmented reality.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A controller to perform a method for controlling a display of a head mounted display (HMD) device, the method comprising the steps of:
    (a) projecting a given user interface element and a selectable user interface element on the display;
    (b) sensing, by a sensor, a user head movement of the HMD device;
    (c) unchanging a given projection position of a projection of said given user interface element when a speed of said user head movement is below a first speed threshold;
    (d) changing said given projection when said speed exceeds said first speed threshold;
    (e) returning said given user interface element and said selectable user interface element to an original position upon sensing said user head movement is paused for a predefined reset period and without overlap between said given user interface element and said selectable user interface element, wherein said given user interface element is projected on a center of the display when in said original position;
    (f) associating multiple frames of user selectable interface elements with multiple segments of a three-dimensional space having an axis system;
    (g) changing an axis position, by tracking said user head movement using said axis system, when said speed is below said first speed threshold or is above a second speed threshold that exceeds said first speed threshold;
    (h) unchanging said axis position when said speed is between said first speed threshold and said second speed threshold; and
    (i) displaying at least one of said multiple frames based on a relationship between a field of view of the HMD device and said axis system.

2. The controller of claim 1, the method further comprising the steps of:
    (j) projecting said given user interface element on a fixed location of the display; and
    (k) determining a selection of said selectable user interface element when said given user interface element and said selectable user interface element overlap for a predefined overlap period.

3. The controller of claim 2, wherein said step of determining includes determining said selection upon detecting no user head movement during said predefined overlap period.

4. The controller of claim 3, wherein said predefined overlap period exceeds one second.

5. The controller of claim 1, wherein said predefined reset period exceeds a predefined overlap period, the method further comprising the step of:
    (j) determining a selection of said selectable user interface element when said given user interface element and said selectable user interface element overlap for said predefined overlap period.

6. The controller of claim 5, wherein said predefined reset period is 1.2 seconds long, and wherein said predefined overlap period is one second long.

7. The controller of claim 1, wherein said step of changing of said given projection position includes tracking said user head movement.

8. The controller of claim 1, the method further comprising the step of changing said first speed threshold based on a history of user head movements.

9. The controller of claim 1, the method further comprising the steps of:
(j) associating a first frame of user interface elements with an area of the display; and
(k) unchanging a first-frame position of a projection of said first frame when said speed is below said first speed threshold;
wherein said first frame includes said given user interface element.

10. The controller of claim 1, wherein the HMD device is a see-through binocular head mounted display (STBHMD) device, the method further comprising the steps of:
(j) performing a calibration process based on:
(i) at least a first image of an objects; and
(ii) user feedback of said STBHMD device;
(k) receiving an input augmented image of said object, wherein said input augmented image includes a certain object image and input digital content referring to a certain object element;
(l) calculating, in response to an outcome of said calibration process, output digital content referring to a visual representation of said certain object element in secondary images of said object; and
(m) displaying said output digital content on the display of said STBHMD device, thereby forming output augmented images of said object.

11. The controller of claim 1, wherein said given user interface element overlaps with multiple selectable user interface elements, the method further comprising the step of:
(j) selecting a selectable user interface element A, having the largest overlap area with said given user interface element, out of said multiple selectable user interface elements.

12. A head mounted display (HMD) device comprising:
(a) a camera;
(b) a display;
(c) a sensor configured to sense a user head movement of the HMD device;
(d) a processor configured for:
(i) associating multiple frames of user selectable interface elements with multiple segments of a three-dimensional space having an axis system;
(ii) changing an axis position, by tracking said user head movement using said axis system, when a speed of said user head movement is below a first speed threshold or is above a second speed threshold that exceeds said first speed threshold; and
(iii) unchanging said axis position when said speed is between said first speed threshold and said second speed threshold; and
(e) a projector configured to project on said display of the HMD device a given user interface element and a selectable user interface element;
wherein the projector is configured, under a control of said processor, for:
(i) unchanging a given projection position of a projection of said given user interface element when said speed is below said first speed threshold;
(ii) changing said given projection position when said speed exceeds said first speed threshold;
(iii) unchanging a selectable projection position of a projection of said selectable user interface element when said speed is below said first speed threshold;
(iv) changing said selectable projection position when said speed exceeds said first speed threshold;
(v) returning said given user interface element and said selectable user interface element to an original position upon sensing said user head movement is paused for a predefined reset period without overlap between said given user interface element and said selectable user interface element, wherein said given user interface element is projected on a center of said display when in said original position; and
(vi) displaying at least one of said multiple frames based on a relationship between a field of view of the HMD device and said axis system.

13. The HMD device of claim 12, wherein said processor is further configured for:
(iv) determining a selection of said selectable user interface element when said given user interface element and said selectable user interface element overlap for a predefined overlap period; and
wherein said projector is further configured for:
(vii) projecting said given user interface element on a fixed location of said display.

14. The HMD device of claim 13, wherein said processor is further configured for:
(v) determining said selection upon detecting no user head movement during said predefined overlap period.

15. The HMD device of claim 14, wherein said predefined overlap period exceeds one second.

16. The HMD device of claim 12, wherein said changing said selectable projection is responsive to a tracking of said user head movement.

17. The HMD device of claim 12, wherein said processor is further configured for:
(iv) changing said first speed threshold based on a history of user head movements.

18. The HMD device of claim 12, wherein said processor is further configured for:
(iv) associating a first frame of user interface elements with an area of said display; and
(v) unchanging a first-frame position of a projection of said first frame when said speed is below said first speed threshold;
wherein said first frame includes said given user interface element.

19. A non-transitory computer readable medium, having computer-readable code embodied on the non-transitory computer-readable medium for controlling a display of a head mounted display (HMD) device, the computer-readable code comprising:
(a) program code for projecting a given user interface element and a selectable user interface element on the display;
(b) program code for sensing, by a sensor, a user head movement of the HMD device;
(c) program code for unchanging a given projection position of a projection of said given user interface element when a speed of said user head movement is below a first speed threshold;
(d) program code for changing said given projection position when said speed exceeds said first speed threshold;
(e) program code for associating multiple frames of user selectable interface elements with multiple segments of a three-dimensional space having an axis system;
(f) program code for changing an axis position, by tracking said user head movement using said axis system, when said speed is below said first speed threshold or is above a second speed threshold that exceeds said first speed threshold;

(g) program code for unchanging said axis position when said speed is between said first speed threshold and said second speed threshold; and (h) program code for displaying at least one of said multiple frames based on a relationship between a field of view of the HMD device and said axis system.

* * * * *